Oct. 6, 1936.　　G. E. EDMUNDS　　2,056,650
MINE CAR
Filed July 13, 1931　　6 Sheets-Sheet 1

Inventor
Glenn E. Edmunds

By Cushman, Bryant, Darby & Cushman
Attorneys

Oct. 6, 1936.   G. E. EDMUNDS   2,056,650
MINE CAR
Filed July 13, 1931   6 Sheets-Sheet 3

Inventor
Glenn E. Edmunds
By
Attorneys

Oct. 6, 1936.  G. E. EDMUNDS  2,056,650
MINE CAR
Filed July 13, 1931   6 Sheets-Sheet 6

Inventor
Glenn E. Edmunds
Attorneys

Patented Oct. 6, 1936

2,056,650

UNITED STATES PATENT OFFICE 2,056,650

MINE CAR

Glenn E. Edmunds, Columbus, Ohio, assignor to The Bonney-Floyd Company, Columbus, Ohio, a corporation of Ohio Application July 13, 1931, Serial No. 550,581

31 Claims. (Cl. 105—364)

The present invention relates to mine cars and particularly to mine cars of the independent stub axle type, a major object of the invention being to increase the volumetric capacity of such cars without increase in the ordinary height, length and width of the car.

Heretofore, mine car bodies have ordinarily been constructed with floor portions at various levels, the maximum depth of the body being between the wheels which are spaced inwardly of the side walls, the body depth between the wheels and side walls and forwardly and rearwardly of the wheels being comparatively shallow. According to the present invention, these shallow portions, or some of them, are deepened to correspond with the body depth between the wheels so that according to one embodiment of the invention, outside of the upwardly extending wheel boxes, a substantially uniplanar floor is secured. The result is a car of maximum capacity and low center of gravity.

In addition to this major feature, the invention includes various other novel structural features and the whole will be described with reference to the accompanying drawings, which are to be considered as merely illustrative and not restrictive of the invention.

Referring first to Figures 1 to 6, the mine car body, as illustrated, comprises a floor 20, vertical side walls 21 and 22, and end walls 23 and 24. Main sills 25 and 26 extend from end to end of the car body in inwardly spaced relation to the side wall, the sills, as here shown, being in the form of angle bars with horizontal webs extending toward each other. Bumper brackets 27 and 28 have arms 29 and 30 extending through the end walls 23 and 24 and secured to the inner faces of the vertical webs of sills 25 and 26. The sills 25 and 26 are on top of the floor 20, and are secured thereto by means of rivets passed through their horizontal webs.

Figure 2:
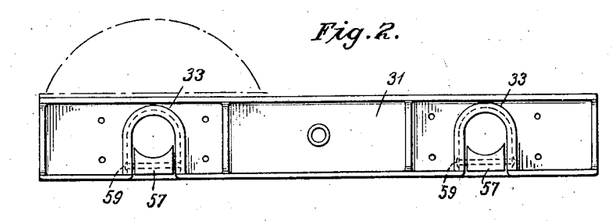
Figures 2 and 3 are elevations of side frames involved in the construction shown in Figure 1.
Figure 5:
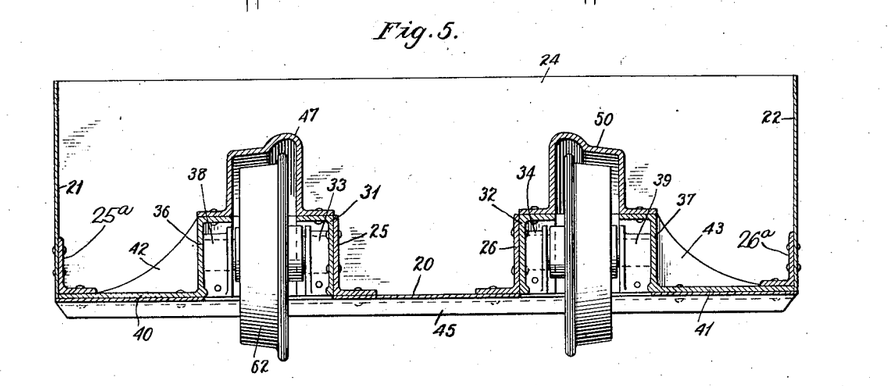
Figure 5 is a section on line 5—5 of Figure 1.
Figure 6:
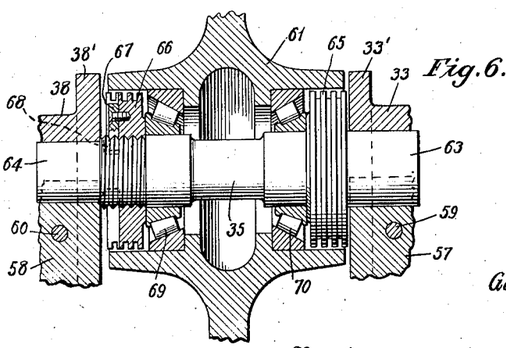
Figure 6 is a section through a wheel hub and stub axle assembly.

Secured to the outer faces of sills 25 and 26 intermediate their ends are inner side frames 31 and 32, each provided with a pair of seats in the nature of journal boxes as at 33 and 34, Figures 2, 5 and 6, for the reception of the inner ends of stub axles of which one is shown at 35, Figure 6.

Figure 3:
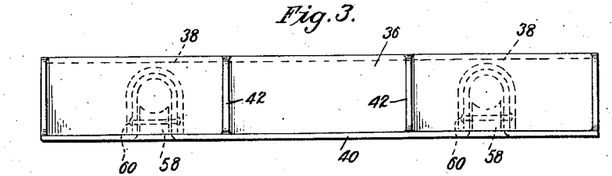
Figure 4:
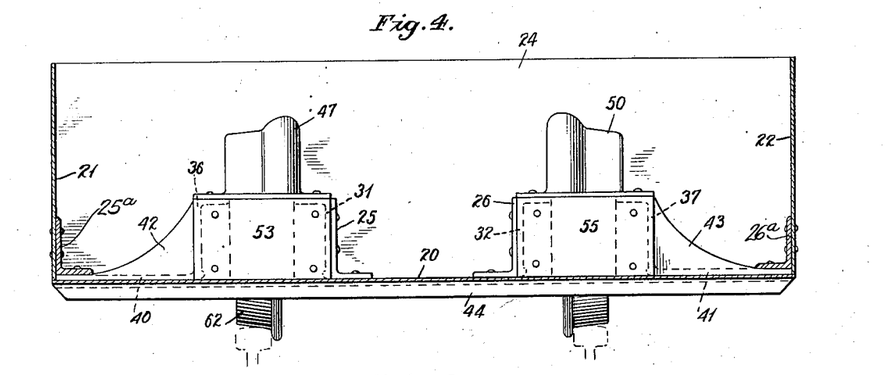
Figure 4 is a section on line 4—4 of Figure 1.

Outer side frames 36 and 37 have seats as at 38 and 39 aligned with the seats in the inner side frames and receiving the outer ends of the stub axles, Figures 3, 5 and 6. At their lower edges the outer side frames 36 and 37 have integral horizontally extending webs 40 and 41 connected with the side frames through gussets 42 and 43, here shown as being integral therewith. Cross sills 44, 45 and 46 extending beneath the floor 20 are riveted to the horizontal webs of the main sills and to the horizontal webs 40 and 41 to support the latter. On the tops of sills 31 and 36 are secured a pair of wheel guards or hoods 47 and 48, and the space between the guards or hoods is filled by a cover plate 49. A pair of wheel guards 50 and 51 are secured to the tops of side frames 32 and 37, the intermediate space being filled by a cover plate 52. The ends of side frames 31 and 36 are joined by end plates 53 and 54, while the ends of frames 32 and 37 are joined by end plates 55 and 56.

It will be seen that webs 40 and 41 constitute floor portions between the wheel boxes, constituted by the side frames and wheel guards, and the side walls. These floor portions are on substantially the same level as the floor portion between the wheel boxes, and the floor portions 20$^a$, 20$^b$, 20$^c$ and 20$^d$, between the wheel boxes and end walls are likewise on the same level. It will thus be evident that, with the exception of the upwardly extending wheel boxes, I obtain a substantially uniplanar floor, so that a body of maximum and uniform depth is secured.

Auxiliary sill angles 25$a$ and 26$a$ extend from end to end of the car and are secured on top of the outer marginal portions of the side flooring including webs 40 and 41. These auxiliary sills serve to connect the flooring with the side walls to which their vertical flanges are riveted. The transverse sills or stiffeners which extend from side to side of the car are rigidly secured to the flooring, to the bearing members and to the main and auxiliary sills so that an extremely rigid wheel mounting structure and general body structure is provided.

As shown in Figures 2 and 3, the axle seats 33 and 38 are downwardly open so that the axles may be readily mounted therein and secured by means of filler blocks 57 and 58 which are held in place by means of pins or bolts 59 and 60.

The stub axles are preferably of the form shown in Figure 6, this axle having the hub 61 of the wheel 62, Figure 5, mounted thereon. The axle comprises end portions 63 and 64 adapted to be received, respectively, in seats 33 and 38, the flange of wheel 62 being adjacent the end 63 which is preferably of greater diameter than end 64. Inwardly of the seat 33 the axle is provided with an integral collar 65, while adjacent end 64 the axle is threaded to receive the threaded collar 66 which may be locked in proper position by means of a screw attached key 67 engaging in a selected radial recess 68 formed in the axle. The wheel hub 61 is supported intermediate the collars on anti-friction bearings 69 and 70. End thrusts of the axle are received by radial flanges 33' and 38' integral with seats 33 and 38, respectively.

The described axle embodies maximum strength where that strength is needed. The axle end adjacent the wheel flange is subjected to the greatest stresses, and hence is of greater diameter than the other axle end. Also the greatest thrusts are transmitted toward the end 63 of the axle and consequently the collar 65 which transmits these thrusts is made integral with the axle.

Figure 7:
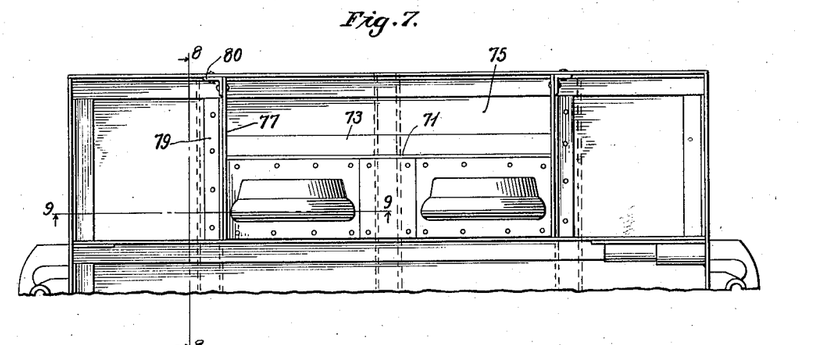
Figure 7 is a partial view in plan of a somewhat modified form of car body.
Figure 8:
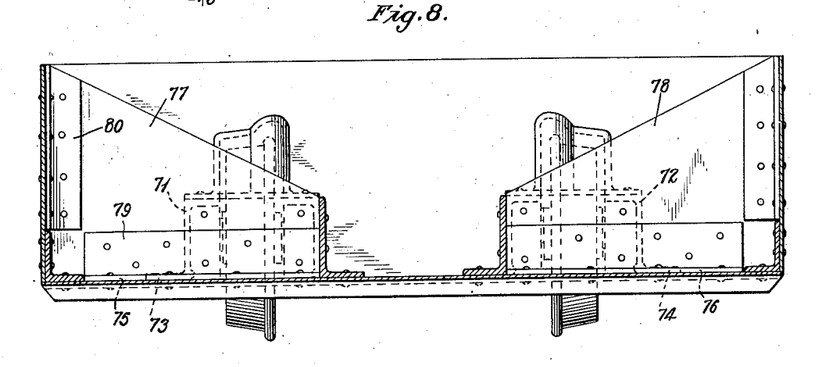
Figure 8 is a section on line 8—8 of Figure 7.
Figure 9:
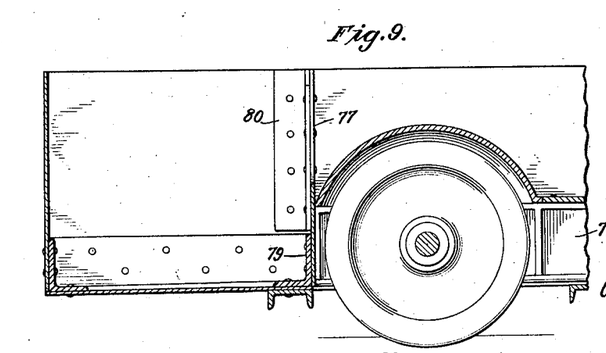
Figure 9 is a section on line 9—9 of Figure 7.

According to Figures 7 to 9, the body structure is substantially the same as that shown in the preceding figures, with the exception that the outer side sills are of somewhat different form and hence necessitate a somewhat modified construction.

Figure 1:
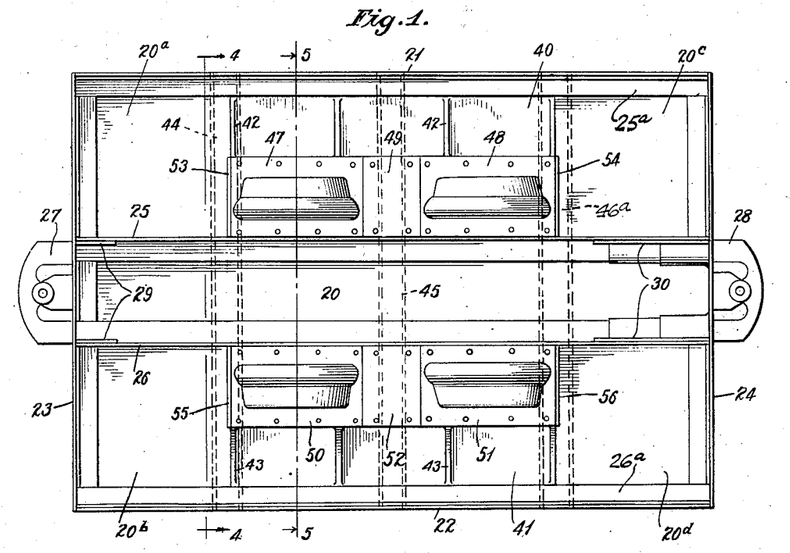
Figure 1 is a plan view of a mine car embodying the present invention.

According to these figures, the outer side sills 71 and 72 have relatively narrow outwardly extending horizontal webs 73 and 74 at their lower edges which are secured to the cross sills. Due to the narrowness of the webs, it is necessary to provide floor portions 75 and 76 between the webs 73 and 74 and the side walls, these floor portions being at the same level as the floor portions at the ends of and between the wheel boxes. The ends of the wheel boxes instead of being closed by the rectangular plates, as described in connection with Figure 1, are closed by portions of gussets 77 and 78 which are secured to the ends of the side frames and extend to the side walls to be secured thereto, the top edges of the gussets being sloped up to the top edges of the side walls in the manner particularly shown in Figure 8. The gussets are secured to the floor and to an underlying cross sill by means of angle bars as at 79 and to the side walls by angle brackets as at 80. The gusset plates 77 and 78 serve to reinforce the body and take the place of the integral gussets 42 and 43, described in connection with the structure shown in Figure 1.

Figure 10:
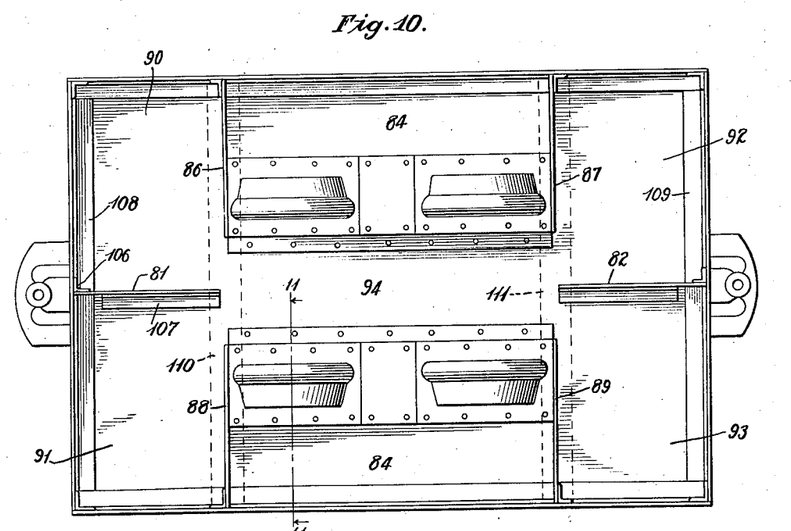
Figure 10 is a plan view of a car embodying the invention in still different form.
Figure 11:
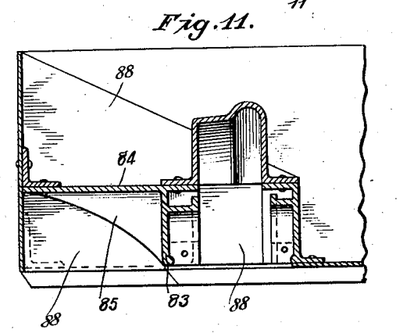
Figures 11, 12, and 13 are sectional views illustrative of various forms of side frame structure and floor supporting structure.

In the construction shown in Figure 10, no main sills extending from end to end of the car body are provided, longitudinal rigidity being afforded by the side frames and auxiliary sills and by gussets 81 and 82 secured to the end wall and floor and extending inwardly of the body on substantially its central longitudinal line to the ends of the wheel boxes. Gusset 81 is secured through its marginal portions to angles 106 and 107 fixed to the end and bottom walls, respectively, of the car body. The adjacent ends of the angles are spaced and the corner of the gusset cut off so as to clear the stiffening angle 108 which extends from side to side of the car body and is secured to the end and bottom walls. Gusset 82 is similarly arranged to clear the end angle 109. In addition to the end angles, transverse stiffening is afforded by channel bars 110 and 111 secured to the floor thereunder at the ends of the wheel boxes. In a narrow car in which the pockets between the wheel boxes and side walls would be of negligible capacity outer side frames such as shown at 83, Figure 11, may be utilized, these side frames having outwardly extending horizontal webs as at 84 at their upper edges, these webs constituting the floor portions between the outer side frames and the side walls. As shown in Figure 11, the side frame 83 and web 84 are connected by integral gussets as at 85. The wheel box ends are preferably closed by gussets 86, 87, 88 and 89 which extend to the side walls in the manner described with reference to Figures 7 to 9. Here, however, the gussets also form inner end walls for the end pockets 90, 91, 92 and 93, these end pockets having floor portions at the same level as the floor portion 94 between the wheel boxes, the floor portions constituted by webs 84 being elevated thereabove as clearly shown in Figure 11.

Figure 12:
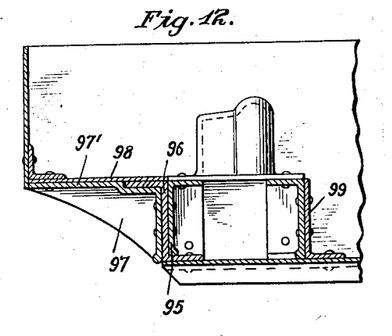

In the construction shown in Figure 12, the outer side frame 95 is secured to the vertical web of a Z-bar 96 which has a lower horizontal portion extending beneath the side frame and an upper outwardly extending horizontal portion. Brackets as at 97 are secured to the outer face of the vertical web of the Z-bar and have top surfaces as at 97' flush with the top surface of the top horizontal web of the Z-bar, these surfaces underlying floor portions as at 98. Also main sills as at 99 are provided so that the end gussets 81 and 82, shown in Figure 10, may be dispensed with.

Figure 13:
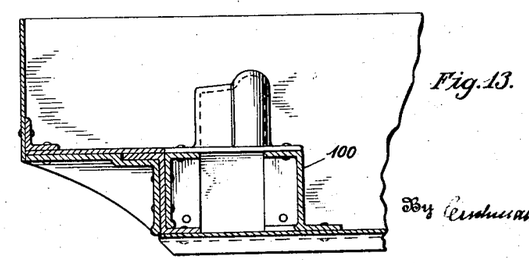

The showing of Figure 13 is the same as that of Figure 12, with the exception that an integral main sill and side frame 100 is provided.

Figure 14:
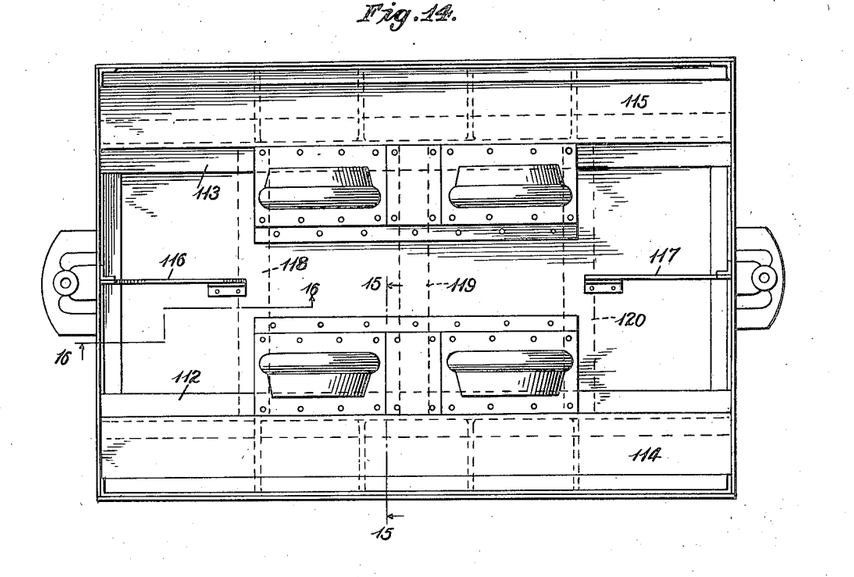
Figure 14 is a plan view of a car embodying a further modified construction.
Figure 15:
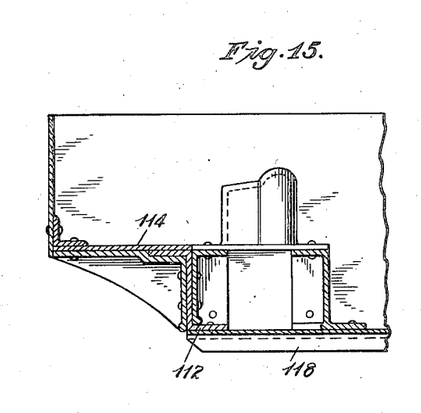
Figure 15 is a section on line 15—15 of Figure 14.
Figure 16:
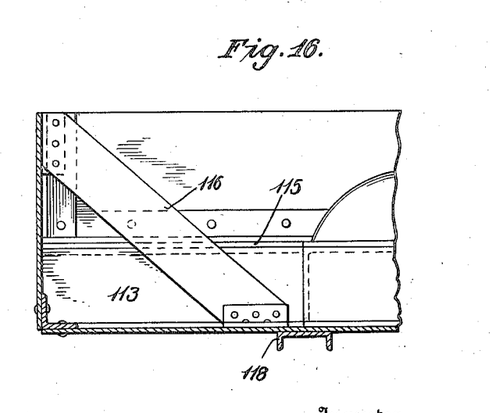
Figure 16 is a section on line 16—16 of Figure 14.

According to Figures 14 to 16 which exemplify another construction particularly applicable to narrow cars, the outer side frames are secured to Z-bars 112 and 113 in the manner shown in Figure 12 but in this instance the Z-bars constitute main sills running the full length of the car. Outer flare plates 114 and 115 are secured to the horizontal top webs of the Z-bars and extend the full length of the car but with these exceptions the car floor throughout is at the level of the bottom horizontal webs of the Z-bars. For the sake of longitudinal rigidity end gusset plates 116 and 117, similar to those described with reference to Figure 10, are provided, and additional transverse rigidity is afforded by transverse bottom channels 118, 119, and 120 disposed at the ends of and between the wheels.

Figure 17:
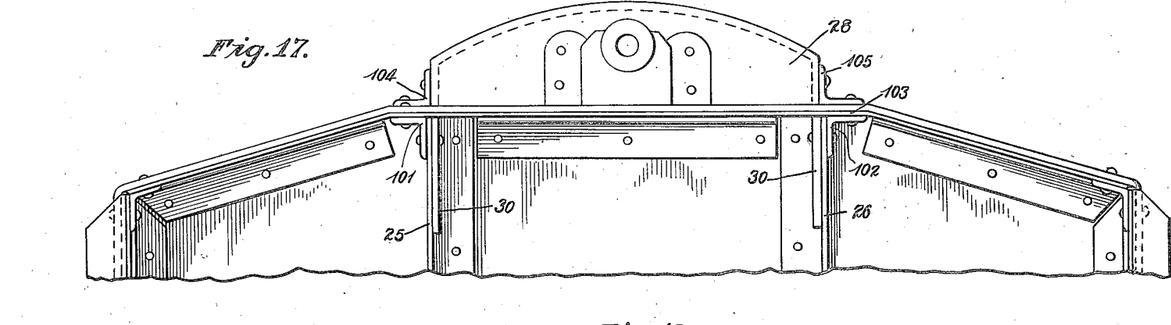
Figure 17 is a plan view of a car body end structure.
Figure 18:
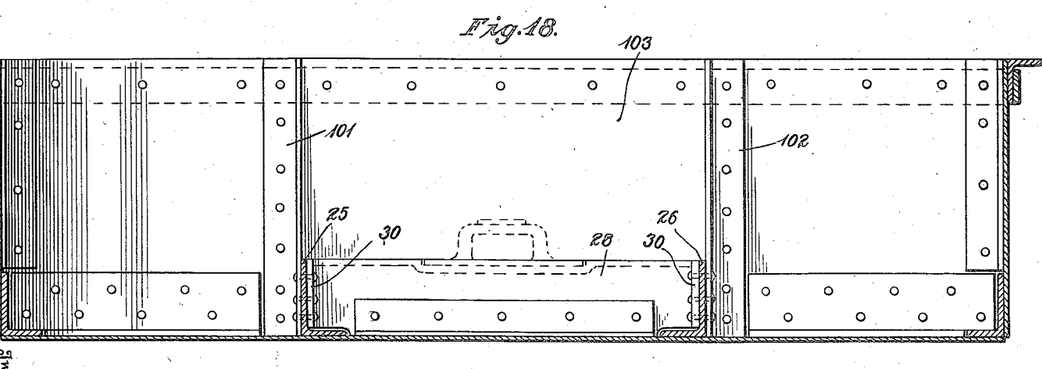
Figure 18 is a view in transverse section of the structure shown in Figure 17.

In Figures 17 and 18, the car body is shown as having a vestibule end, the floor at the end of the body being substantially uniplanar. In order to reinforce the end walls, I provide vertically extending angle bars 101 and 102 whose webs are secured, respectively, to the outer faces of sills 25 and 26 and to the end wall 103. I may further provide similar angle bars 104 and 105 having their webs secured, respectively, to the bumper bracket 28 and to end walls 103 exteriorly thereof.

It will be understood that, while I have specifically described practical structure embodying my invention, I do not limit myself to the details described, many changes being possible without departure from the scope of the following claims.

I claim:

1. In a mine car, a car body comprising a floor and side and end walls extending upwardly from the floor, and a pair of wheel boxes projecting above the floor, said wheel boxes being spaced inwardly from the side walls and terminating short of the end walls, the floor being at substantially the same level on all sides of the wheel boxes, the outer side walls of the wheel boxes being constituted by side frames having outwardly extending bottom web portions, said web portions constituting portions of the floor between the wheel boxes and side walls.

2. In a mine car body comprising a floor and side and end walls extending upwardly from the floor, a pair of wheel boxes projecting above the floor, said wheel boxes being spaced inwardly from the side walls and terminating short of the end walls, the floor being at substantially the same level on all sides of the wheel boxes, the outer side walls of the wheel boxes being constituted by side frames having outwardly extending bottom web portions, said web portions constituting portions of the floor between the wheel boxes and side walls, and integral gussets connecting the respective side frames and web portions.

3. In a mine car, a car body comprising a floor and side and end walls extending upwardly from the floor, a pair of wheel boxes projecting above the floor, said wheel boxes being spaced inwardly from the side walls and terminating short of the end walls, the floor being at substantially the same level on all sides of the wheel boxes, the outer side walls of the wheel boxes being constituted by side frames having outwardly extending bottom web portions, and cross sills secured to said web portions therebeneath and projecting laterally therebeyond.

4. In a mine car, a car body comprising a floor and side and end walls extending upwardly from the floor, and a pair of wheel boxes projecting above the floor, said wheel boxes being spaced inwardly from the side walls and terminating short of the end walls, the floor being at substantially the same level on all sides of the wheel boxes, said wheel boxes having end walls constituted by portions of gusset plates which extend to the adjacent side walls and are secured to the latter.

5. In a mine car, a car body comprising, a floor and side and end walls extending upwardly from the floor, and a pair of wheel boxes projecting above the floor, said wheel boxes being spaced inwardly from the side walls and terminating short of the end walls, the floor being at substantially the same level on all sides of the wheel boxes, said wheel boxes having end walls constituted by portions of gusset plates which extend to the adjacent side walls and are secured to the latter the upper edges of the gusset plates being inclined from the tops of the wheel boxes to the tops of the side walls.

6. In a mine car, a car body comprising a floor and side and end walls extending upwardly from the floor, a pair of wheel boxes each comprising spaced inner and outer side frames, the wheel boxes being spaced inwardly from the side walls and terminating short of the end walls, said boxes projecting above the floor portions at the ends of and between the boxes, said floor portions being on substantially the same level, plates secured across the ends of the side frames and extending to the adjacent side walls, and means securing said plates to the side walls.

7. In a mine car, a car body comprising a floor and side and end walls extending upwardly from the floor, a pair of wheel boxes each comprising spaced inner and outer side frames, the wheel boxes being spaced inwardly from the side walls and terminating short of the end walls, said boxes projecting above the floor portions at the ends of and between the boxes, said floor portions being on substantially the same level, plates secured across the ends of the side frames and extending to the adjacent side walls, and means securing said plates to the side walls and floor.

8. In a mine car, a car body comprising a floor and side and end walls extending upwardly from the floor, a pair of wheel boxes each comprising spaced inner and outer side frames, the wheel boxes being spaced inwardly from the side walls and terminating short of the end walls, said boxes projecting above the floor portions at the ends of and between the boxes, said floor portions being on substantially the same level, plates secured across the ends of the side frames and extending to the adjacent side walls, and means securing said plates to the side walls and floor, the floor portions between the wheel boxes and side walls being on the same level as the first mentioned portions.

9. In a mine car, a car body comprising a floor and side and end walls extending upwardly from the floor, a pair of wheel boxes each comprising spaced inner and outer side frames, the wheel boxes being spaced inwardly from the side walls and terminating short of the end walls, said boxes projecting above the floor portions at the ends of and between the boxes, said floor portions being on substantially the same level, plates secured across the ends of the side frames and extending to the adjacent side walls, and means securing said plates to the side walls and floor, the floor portions between the wheel boxes and side walls being at substantially the tops of the side frames.

10. In a mine car, a car body comprising a floor and side and end walls extending upwardly from the floor, a pair of wheel boxes projecting above the floor, said wheel boxes being spaced inwardly from the side walls and terminating short of the end walls, and gussets secured to the end walls and floor and extending inwardly substantially to the ends of the wheel boxes.

11. In a mine car of the independent stub axle type, inner and outer spaced side frames having aligned axle receiving seats, the outer side frames having substantially horizontal bottom web portions extending laterally and outwardly a substantial distance beyond the vertical plane of the outer side frames, and body walls supported upon said outwardly extending webs.

12. In a mine car, a main sill in the form of a Z-bar disposed with its parallel webs in horizontal planes, a side frame secured on one side of the vertical web of the Z-bar, and a bracket secured on the other side of said vertical web and having a surface co-planar with the outer surface of one of the horizontal webs.

13. In a mine car, a main sill in the form of a Z-bar disposed with its parallel webs in horizontal planes and with the top horizontal web projecting toward the adjacent side of the car, a bracket secured to the outer face of the vertical web of the Z-bar and having a top surface co-planar with the top surface of said top horizontal web, and a side frame secured to the inner face of the vertical web.

14. In a mine car of the independent stub axle type comprising inner and outer spaced side frames having aligned seats, a stub axle mounted in said seats and having an integral collar adjacent the inner side frame, a removable collar on said axle adjacent the outer side frame, bearings on said axle intermediate the collars, and a car wheel mounted on said bearings with its flange adjacent the inner side frame.

15. In a mine car of the independent stub axle type comprising inner and outer spaced side frames having aligned seats, a stub axle having its ends mounted in said seats and having an integral collar adjacent the inner side frame, the end of the axle in the inner side frame seat having a greater diameter than the other end and intermediate axle portions, a collar threaded on the axle adjacent the outer side frame, bearings on the axle intermediate the collars, and a car wheel mounted on said bearings with its flange adjacent the inner side frame.

16. In a mine car, a car body comprising a floor and side and end walls extending upwardly from the floor, center sill members extending lengthwise of the car body, said sill members having vertical webs and horizontal inwardly extending webs secured to the floor, the flooring outwardly of said sill members being provided with openings, and wheel boxes arranged in said openings and projecting upwardly above the floor; each of said wheel boxes comprising inner and outer side frames of which the inner is secured to the adjacent center sill, bearings for a pair of wheeled stub axles, and wheel hoods secured to the side frames above said axle.

17. In a mine car, a car body comprising a floor and side and end walls extending upwardly from the floor, center sill members extending lengthwise of the car body, said sill members having vertical webs and horizontal inwardly extending webs secured to the floor, the flooring outwardly of said sill members being provided with openings, and wheel boxes arranged in said openings and projecting upwardly above the floor; each of said wheel boxes comprising inner and outer side frames of which the inner is secured to the adjacent center sill, bearings for a pair of wheeled stub axles, and wheel hoods secured to the side frames above said axles; the floor outwardly of said wheel boxes being at substantially the level of the floor between said sill members.

18. In a mine car, a car body comprising a floor and side and end walls extending upwardly from the floor, center sill members extending lengthwise of the car body, said sill members having vertical webs and horizontal inwardly extending webs secured to the floor, the flooring outwardly of said sill members being provided with openings, and wheel boxes arranged in said openings and projecting upwardly above the floor; each of said wheel boxes comprising inner and outer side frames of which the inner is secured to the adjacent center sill, bearings for a pair of wheeled stub axles, and wheel hoods secured to the side frames above said axles; the floor outwardly of said wheel boxes and at the ends thereof being at substantially the level of the floor between said sill members, and means closing the ends of the wheel boxes.

19. A mine car having a body comprising side and end walls and a lading flooring, a pair of main sills extending from end to end of the car in inwardly spaced relation to the side walls above said flooring and secured to the latter, wheel openings in said flooring between the respective sills and adjacent side walls, wheel housings closing said openings and secured to said sills and side walls and to the transverse flooring margins at the openings; said housings having opposite walls provided with bearings for the ends of stub axles, stub axles in said bearings with their axes above the level of the flooring portion between the main sills, and wheels in said housings mounted on said axles.

20. A mine car having a body comprising side and end walls and a lading flooring flat substantially throughout, a pair of main sills extending from end to end of the car in inwardly spaced relation to the side walls above said flooring and secured to the latter, auxiliary sills spaced outwardly of the main sills, wheel openings in said flooring between the respective main sills and auxiliary sills, wheel housings closing said openings and secured to the main and auxiliary sills and to the transverse flooring margins at the openings; and wheels in said housings mounted for rotation on axes above the level of said flooring.

21. A mine car having a body comprising side and end walls and a lading flooring, a pair of main sills extending from end to end of the car in inwardly spaced relation to the side walls above said flooring and secured to the latter, wheel openings in said flooring between the respective sills and adjacent side walls, wheel housings closing said openings and secured to said sills and side walls and to the transverse flooring margins at the openings, transverse stiffening members extending beneath the flooring and secured thereto and to the ends of the wheel housings and to the side walls; said housings having opposite walls provided with bearings for the ends of the stub axles, stub axles in said bearings with their axes above the level of the flooring portion between the main sills, and wheels in said housings mounted on said axles.

22. A mine car having a body comprising side and end walls and a lading flooring flat substantially throughout, a pair of main sills extending from end to end of the car in inwardly spaced relation to the side walls above said flooring and secured to the latter, auxiliary sills spaced outwardly of the main sills, wheel openings in said flooring between the respective main sills and auxiliary sills, wheel housings closing said openings and secured to the main and auxiliary sills and to the transverse flooring margins at the openings, transverse stiffening members extending beneath the flooring and secured thereto and to the ends of the wheel housings and to the auxiliary sills, and wheels in said housings mounted for rotation on axes above the level of said flooring.

23. A mine car having a body comprising side and end walls and a lading flooring, a pair of main sills extending from end to end of the car in inwardly spaced relation to the side walls above said flooring and secured to the latter, wheel openings in said flooring immediately outwardly of said sills and spaced from the side walls, wheel housings closing said openings and rigidly connected to said sills and side walls and to the transverse flooring margins at the openings, said wheel housings being spaced from the side walls; and wheels in said housings mounted for rotation on axes above the level of at least the portion of said flooring which is between the main sills.

24. A mine car having a body comprising side and end walls and a lading flooring, said flooring comprising a central portion and side portions, a pair of main sills extending from end to end of the car between the central and side flooring portions and secured thereto, wheel openings in the side flooring portions, inner and outer bearings for stub axles at said openings with the inner bearings secured to the main sills, stiffening members extending transversely beneath the flooring and secured thereto and to the end portions of the outer bearings; and wheeled stub axles journaled in said bearings on axes above the central flooring portion.

25. A mine car having a body comprising side and end walls and a lading flooring, said flooring comprising a central portion and side portions, a pair of main sills extending from end to end of the car between the central and side flooring portions and secured thereto, said sills being above at least the central flooring portion, auxiliary sills spaced outwardly of the main sills, wheel openings in said flooring between the respective main sills and auxiliary sills, wheel housings closing said openings and secured to the main and auxiliary sills and to the transverse flooring margins at the openings, said housings having opposite walls provided with bearings for the ends of stub axles, stub axles in said bearings with their axes above the central flooring portion, and wheels in said housings mounted on said axles.

26. A mine car having a body comprising side and end walls and a lading flooring, said flooring comprising a central portion and side portions, a pair of main sills extending from end to end of the car between the central and side flooring portions and secured thereto, said main sills projecting above the central flooring portion, wheel openings in the side flooring portions, wheel housings closing said openings and secured to the main and auxiliary sills, transverse stiffening members extending beneath the flooring and secured thereto and to the ends of the wheel housings and to the auxiliary sills, said housings having opposite walls provided with bearings for the ends of stub axles, stub axles in said bearings with their axes above the level of the central flooring, and wheels in said housings mounted on said axles.

27. Structure according to claim 25 wherein each wheel housing has longitudinally spaced pairs of bearings.

28. Structure according to claim 26 wherein each wheel housing has longitudinally spaced pairs of bearings.

29. In a car of the class described, a body comprising side walls and flooring, longitudinal sills spaced inwardly from the side walls and to which the flooring is secured, wheel openings in the side flooring portions between said sills and side walls; and wheel mounting means at each of said openings and each comprising spaced transverse stiffening elements extending along the margins of the side flooring at an opening and secured to said margins, said stiffening elements being rigidly secured to the sill and side wall which are adjacent the opening, a bearing for one end of a stub axle secured to the sill at the opening, a rigid element extending in the longitudinal direction of the car between said transverse elements and rigidly fixed thereto, a bearing for the other end of a stub axle carried by said longitudinally extending element, and a wheeled stub axle mounted in said bearing.

30. Structure according to claim 29 wherein said transverse elements are secured to the side walls through the intermediary of auxiliary sills.

31. Structure according to claim 29 wherein said transverse elements are secured to the side walls through the intermediary of auxiliary sills which also serve to connect the side walls and side flooring portions.

GLENN E. EDMUNDS.